(12) United States Patent
Bea et al.

(10) Patent No.: US 10,675,708 B2
(45) Date of Patent: Jun. 9, 2020

(54) METHOD FOR LASER CUTTING WITH OPTIMIZED GAS DYNAMICS

(71) Applicant: TRUMPF Werkzeugmaschinen GmbH + Co. KG, Ditzingen (DE)

(72) Inventors: Martin Bea, Kornwestheim (DE); Tobias Kaiser, Rutesheim (DE); Volker Rominger, Steinheim an der Murr (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 191 days.

(21) Appl. No.: 15/675,195

(22) Filed: Aug. 11, 2017

(65) Prior Publication Data
US 2018/0043469 A1 Feb. 15, 2018

(30) Foreign Application Priority Data
Aug. 11, 2016 (DE) .................. 10 2016 215 019

(51) Int. Cl.
| | | |
|---|---|---|
| B23K 26/14 | (2014.01) | |
| B23K 26/16 | (2006.01) | |
| B23K 26/02 | (2014.01) | |
| B23K 26/06 | (2014.01) | |

(Continued)

(52) U.S. Cl.
CPC .......... *B23K 26/02* (2013.01); *B23K 26/0665* (2013.01); *B23K 26/1436* (2015.10); *B23K 26/1462* (2015.10); *B23K 26/1476* (2013.01); *B23K 26/38* (2013.01); *B23K 2101/18* (2018.08)

(58) Field of Classification Search
CPC ....... B23K 26/14–1438; B23K 26/1462–1494; B23K 26/16
See application file for complete search history.

(56) References Cited

U.S. PATENT DOCUMENTS

| | | | |
|---|---|---|---|
| 5,313,042 A | * | 5/1994 | Matsuyama ....... B23K 26/0643 219/121.6 |
| 6,163,010 A | | 12/2000 | Kobsa |

(Continued)

FOREIGN PATENT DOCUMENTS

| | | |
|---|---|---|
| CN | 1972039 | 5/2007 |
| CN | 102256738 | 11/2011 |

(Continued)

OTHER PUBLICATIONS

Office Action in Chinese Application No. 201710680180.6, dated Jul. 13, 2018, 15 pages (with English translation).

(Continued)

*Primary Examiner* — Michael A Laflame, Jr.
(74) *Attorney, Agent, or Firm* — Fish & Richardson P.C.

(57) ABSTRACT

This disclosure relates to methods for cutting metal workpieces in sheet form with a thickness of at least 2 mm. A laser beam is positioned in a nozzle opening of a cutting gas nozzle configured to cut via the laser beam and a cutting gas so that a beam axis of the laser beam along a direction of propagation of the laser beam is at least a distance of 3 mm from a rear opening wall portion of the nozzle opening. Cutting gas configured for concurrently exiting the nozzle opening with the laser beam is emitted through the nozzle opening at a cutting gas pressure (p) of at most 10 bar.

10 Claims, 2 Drawing Sheets

(51) Int. Cl.
  *B23K 26/38* (2014.01)
  *B23K 101/18* (2006.01)

(56) References Cited

U.S. PATENT DOCUMENTS

| | | | |
|---|---|---|---|
| 6,426,479 B1* | 7/2002 | Bischof | B23K 26/123 219/121.5 |
| 6,934,014 B1* | 8/2005 | Kleinhuber | B23K 26/032 219/121.74 |
| 2006/0252356 A1* | 11/2006 | Webster | B24B 53/095 451/65 |
| 2007/0119833 A1 | 5/2007 | Brand et al. | |
| 2008/0085368 A1* | 4/2008 | Gauthier | C23C 14/28 427/314 |
| 2009/0218326 A1* | 9/2009 | Chouf | B23K 26/0648 219/121.72 |
| 2011/0210109 A1 | 9/2011 | Szelagowski et al. | |
| 2012/0012570 A1 | 1/2012 | Briand et al. | |
| 2013/0073071 A1* | 3/2013 | Culp | B23K 26/083 700/108 |
| 2014/0069898 A1* | 3/2014 | Debecker | B23K 26/38 219/121.72 |
| 2017/0189993 A1* | 7/2017 | Lefebvfre | B23K 37/006 |

FOREIGN PATENT DOCUMENTS

| | | |
|---|---|---|
| DE | 102007042490 | 10/2008 |
| DE | 102012100721 | 4/2013 |
| DE | 102014206358 | 10/2015 |
| EP | 0458180 | 11/1991 |
| EP | 0770448 | 5/1997 |
| EP | 1669159 | 6/2006 |
| JP | S56-136295 | 10/1981 |
| JP | H 04253584 | 9/1992 |
| JP | H06-320295 | 11/1994 |
| JP | H09-239577 | 9/1997 |
| JP | H11-010382 | 1/1999 |
| JP | H 11277287 | 10/1999 |
| JP | 2000-107879 | 4/2000 |
| JP | 2003048090 A | 2/2003 |
| JP | 2003-313013 | 11/2003 |
| JP | 2007144518 A | 6/2007 |
| JP | 2014018839 A | 2/2014 |
| KR | 1019990067086 | 8/1999 |
| WO | WO1997015417 A1 | 5/1997 |
| WO | WO 2004/060602 | 7/2004 |
| WO | WO 2010/049032 | 5/2010 |
| WO | WO 2015/170029 | 11/2015 |
| WO | WO2016046954 A1 | 3/2016 |

OTHER PUBLICATIONS

Bliedtner et al., "Laser material-bearbeitung," 2013, 15 pages (with translation).
By Sprint Fiber Manual, Bystronic Laser AG, Jun. 2015, 2 pages (with English translation).
Extract from catalogue: Centricut, 2013-2014 C02 laser consumables, Sep. 2013, 6 pages.
Extract from catalogue: II-IV Infrared, C02 & Fiber Laser Nozzles and accessories, Jan. 2014, 2 pages.
Extract, ByAutonom Manual, Apr. 2014, 2 pages (with English translation).
Extract, ByAutonom Manual, Apr. 2014, 16 pages (with English translation).
Extract, BySprint Fiber Manual, Bystronic Laser AG, Jun. 2015, 20 pages (with English translation).
Kummel, "Technical fluid mechanics: theory and practice," 2007, 10 pages (with English translation).
Oefele, "Remote laser welding with brilliant laser beam sources," Thesis for degree of Doctor-Engineer, Technical University of Munich, 2012, 13 pages (with English translation).

* cited by examiner

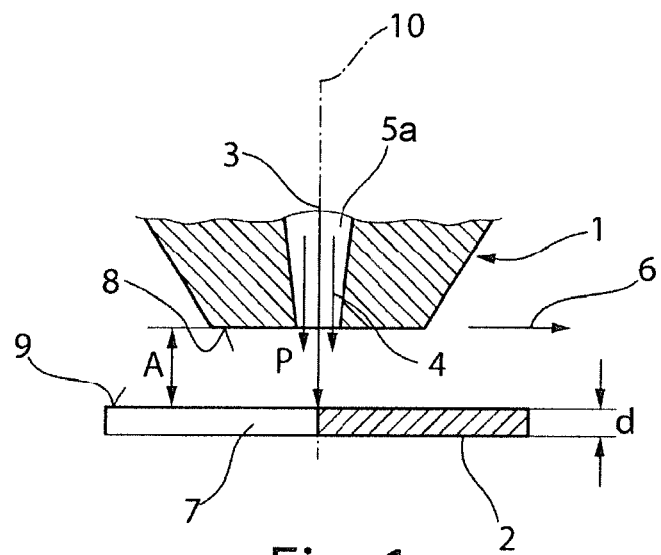
Fig. 1
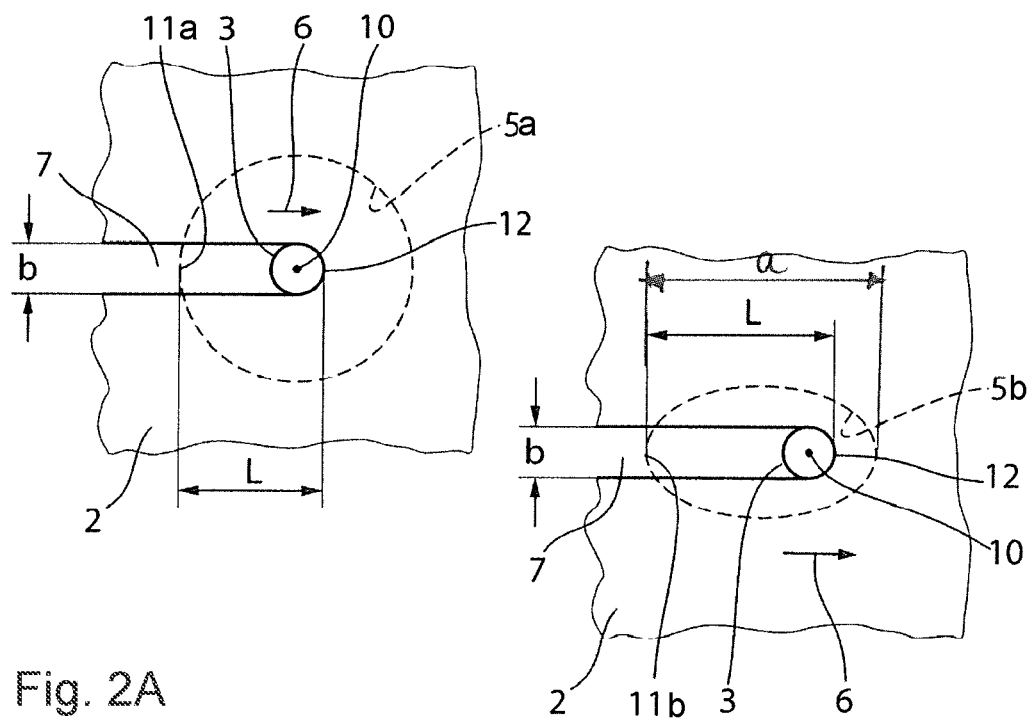
Fig. 2A
Fig. 2B

METHOD FOR LASER CUTTING WITH OPTIMIZED GAS DYNAMICS

CROSS-REFERENCE TO RELATED APPLICATION

This application claims priority to German Application No. DE 10 2016 215 019.7, filed on Aug. 11, 2016. The contents of this priority application are hereby incorporated by reference in their entirety.

TECHNICAL FIELD

The invention relates to methods for cutting metal workpieces in sheet form using a laser beam and a cutting gas, which both together exit through a nozzle opening of a cutting gas nozzle.

BACKGROUND

Cutting gas nozzles with as small a nozzle diameter as possible may be used during laser cutting to avoid a high cutting gas consumption. A gas pressure in the range from 10 bar to 25 bar (N2 high-pressure fusion cutting process) is generally used to be able to cut with such nozzles at a good quality. Generally, and in particular when cutting pointed corners, inefficient introduction of the cutting gas can lead to a reduction in the cutting speed or to the formation of burrs. Setting the cutting parameters appropriately for the gas flow conditions that are prevailing in the cutting process is an absolute prerequisite here for good cutting results and stable production conditions.

JP 2003048090A discloses a method for cutting metal workpieces in sheet form using a laser beam and a cutting gas. JP 2003048090A discloses reducing the pressure of the cutting gas during the fusion cutting of workpieces with a thickness of over 8 mm to avoid the generation of nitrogen plasma in the cutting gap when cutting with $CO_2$ laser radiation. JP 2003048090A discloses using a cutting gas nozzle with a specially formed inner contour, which has a region with an increased diameter at the nozzle mouth, for this purpose. The nozzle outlet opening on the workpiece side has a diameter of 4 mm, and the pressure of the cutting gas lies in a range from 7.8 bar to 13.7 bar.

SUMMARY

Various embodiments of the present invention disclosed herein provide methods and systems for laser cutting of (in particular metal) workpieces in sheet form, whereby good quality of the cut edge is achieved at a high cutting speed.

In one aspect, the disclosure provides methods wherein at the height of the nozzle end face on the workpiece side a distance of at least 3 mm is provided between the beam axis and the rear opening wall portion of the nozzle opening viewed in the cutting direction. The cutting gas exiting through the nozzle opening has a cutting gas pressure of at most 10 bar. Seen in the direction of the beam axis, the cutting gap extending from the cutting front is therefore covered or overlapped by the nozzle opening of the cutting gas nozzle over a length of at least 3 mm.

In certain implementations, a smaller expansion of the cutting gas exiting through the nozzle opening on the workpiece side is caused by the cutting gas pressure being below 10 bar. Reducing the speed of the flow has the effect of reducing the number and intensity of pressure impacts in the cutting gas jet within the cutting gap. Due to the great coverage of the cutting gap by the nozzle opening, a breakaway of the cutting gas flow from the surface of the cutting front only occurs—if at all—after a greatest possible extent of penetration into the cutting gap. These effects make a higher cutting speed possible with at the same time a high quality of the cut edges or corners and also an increase in the maximum workpiece thickness that can be cut.

According to the embodiments of the invention, it has been recognized that the form of the nozzle inner contour only has a small influence on the cutting quality when cutting thick workpieces and that the influence of the cutting gas pressure is decisive. The form of the nozzle may be divergent or convergent, or the cutting gas nozzle may be formed as a bypass flow nozzle or a nozzle having an oblong hole. When cutting workpieces with a thickness of more than 2 mm, a high cutting gas pressure together with small nozzle diameters leads to an inhomogeneous gas flow in the cutting gap. The gas jet, expanding greatly downstream of the nozzle opening, has a highly inhomogeneous density and speed distribution along the direction of its propagation. As a result, the shearing forces acting on the cutting front and the melt in the workpiece vary greatly in the direction of propagation of the jet. Moreover, the gas flow already breaks away from the surface of the cutting front at a small depth in the cutting gap (near the workpiece surface), which means that in the lower region of the cutting gap there is a loss of the shearing forces expelling the melt and which has as a consequence a cutting edge of low quality due to a significant formation of burr.

The greater the thickness of the workpiece and the higher the speed of the gas when it enters the cutting gap, the more the gas jet becomes turbulent in the cutting gap and the more improbable it becomes that this turbulent gas jet will produce a filament of melt that leaves the cutting gap homogeneously and breaks away from the underside of the workpiece without leaving any remains (i.e., without any burrs). The greater the depth of a cutting gap and the higher the entry speed of a gas flow into a cutting gap, the more the gas flow is also slowed down in this cutting gap.

If the volumetric flow of gas required for melt expulsion is directed onto the cutting gap through a cutting gas nozzle with a small nozzle opening, the cutting gas must necessarily flow out of the nozzle opening at a high speed, and thereby undergoes a very great slowing effect in the direction of use (i.e. parallel to the laser beam) in the cutting gap. Transverse to the initial direction of propagation (i.e. counter to the cutting direction, into the cutting gap already produced), the slowing effect on the gas jet is less however, because its initial speed in this direction after leaving the nozzle opening is likewise lower. The "fierce" high-pressure gas jet that leaves a small nozzle opening and has a narrowly limited lateral extent and a high entry speed into the cutting gap therefore increasingly changes its direction after a short depth of penetration into the cutting gap as a result of the high slowing effect along the jet axis, and flows away increasingly horizontally into the already produced cutting gap due to the lower slowing effect transversely to the jet axis. As a result, even after a short depth of penetration, the gas jet is no longer available for the acceleration of the melt film (i.e., for melt expulsion), and the cutting result becomes poorer, because burr is created.

However, if the same volumetric gas flow per unit of time that is required for transporting a given melt is directed onto the cutting gap through a cutting gas nozzle with a very much larger nozzle opening, a much lower cutting gas pressure is required for this. As a result, this "soft" cutting gas jet has a much lower entry speed into the cutting gap, as a result experiences a much lower slowing effect in the direction of use (i.e., parallel to the laser beam axis) and as a result neither changes its speed nor its direction in any significant way while it passes through the cutting gap. This soft cutting gas jet with a wide lateral extent and low entry speed into the cutting gap is therefore available for the acceleration and expulsion of the melt film over the complete thickness of the workpiece, and as a result makes cuts without the possibility of burrs.

Various methods according to embodiments of the invention allow the speed of the process, for example in the case of a fusion cut (cutting gas nitrogen), to be increased in comparison with conventional laser cutting processes by up to 50%. Moreover, the great coverage of the cutting gap by the nozzle opening has the effect of reducing the formation of burr and oxidations when there are abrupt changes of direction: the "soft" larger-area gas flow from nozzles with large diameters is better suited for still reliably expelling even melt that is produced further behind in the cutting gap downwards out of the cutting gap, and thereby avoiding formation of burr when moving around curves with a lower rate of advancement. In addition, thicker workpieces also can be cut without any burrs. Furthermore, processes with a limited gas pressure, such as for example compressed air cutting (typically carried out with a gas pressure of <6 bar) or cutting with nitrogen generated in situ by nitrogen generators, can also be used for workpiece thicknesses that previously could not be cut without burrs.

Moreover, the soft cutting gas jet has less of a suction effect on the atmosphere surrounding the location of the process, whereby less outside air is introduced into the cutting gap for example when cutting with nitrogen. As a result, less oxidation of the cut edges takes place and/or nitrogen of a lower purity can be used.

According to various embodiments of the invention, the coverage of the cutting gap by the nozzle opening is especially decisive, not just the minimum cross-sectional area of the nozzle opening. In the case of thinner workpieces (for example a workpiece thickness of 5 mm) coverages of at least 3 mm and in the case of thicker workpieces (for example a workpiece thickness of 15 mm) and coverages of at least 4 mm have proven to be advantageous. The aim is to keep this ratio at the maximum; in terms of gas dynamics, a cutting gas coverage of the cutting gap that is as great as possible should be aimed for, in particular when moving around corners. Restrictions arise only from aspects of economy and flexibility: larger nozzle openings mean an increased consumption of gas and increased risk of collision with the adjacent parts of a workpiece that have already been cut. Therefore, the nozzle openings are chosen to be smaller for thinner workpieces. In certain implementations, for workpieces with a thickness of greater than 10 mm, the beam axis of the laser beam is at a distance of at least 4 mm from the rear opening wall portion of the nozzle opening.

In certain implementations, the opening area of the nozzle opening on the workpiece side, the distance of the nozzle end face from the workpiece surface and the cutting gas pressure can be chosen such that the maximum speed of the gas flow when it enters the cutting gap does not exceed the speed of sound.

In some implementations, the opening diameter of the nozzle opening on the workpiece side (in the case of circular nozzle openings) or the length of the nozzle opening in the long axis (in the case of oval or rectangular nozzle openings, slot nozzles) preferably corresponds to 10 times to 30 times the cutting gap width. Thus, the nozzle opening diameter or the size of the nozzle opening is adapted to the workpiece thickness, since the cutting gap width increases with increasing workpiece thickness. This counteracts an increase in the cutting gas consumption caused by a nozzle opening that is too large. In one embodiment, the opening diameter of the nozzle opening on the workpiece side or the length of the nozzle opening in the long axis is at least 7 mm. When cutting workpieces with a thickness of more than 2 mm, the nozzle opening diameter is typically between 7 mm and 12 mm and the cutting gas pressure is between 1 bar and 6 bar.

A number of positive effects on the cutting gas flow can be combined by the simultaneous use of cutting gas nozzles with large opening diameters (at least in the long axis) of more than 7 mm and low cutting gas pressures of below 10 bar: the low gas pressure leads to a reduced expansion of the cutting gas at the nozzle opening, and consequently to less formation of pressure impacts. A large nozzle opening leads to a greater coverage of the cutting gap by the nozzle opening, whereby the cutting gas jet fans out to a lesser extent in the cutting gap, and consequently the breakaway point of the cutting gas from the surface of the cutting front can be shifted significantly downwards. In addition, there is a decrease in the gas density in the cutting gap, which reduces the probability of the creation of a nitrogen plasma with an adverse effect on the cutting quality and cutting speed in cases of high laser power outputs and the use of a $CO_2$ laser as the beam source.

To additionally counteract an increase in the cutting gas consumption caused by the large nozzle opening, the distance between the nozzle opening and the workpiece surface should be chosen to be as small as possible. Ideally, a zero gap should be set with the aid of a placed-on nozzle, because in this case, the gas consumption can be reduced to a minimum and the gas flow is ideally introduced into the cutting gap. Therefore, the distance of the nozzle end face from the workpiece surface is preferably between 0 mm and 0.5 mm.

The maximum efficiency in the conversion of laser power into melting efficiency (i.e., maximum introduction efficiency) is achieved when the ratio between the workpiece thickness and the cutting gap width or the focus diameter corresponds to a value of 5. The focus diameter should therefore ideally be ⅕ of the workpiece thickness and not less than ¹⁄₁₀ to ¹⁄₃₀ of the workpiece thickness. In this way, the part of the cutting gap that is facing in the direction of advancement (the cutting front) can be optimally melted by the laser beam. At the same time, the cutting gas can penetrate more easily into the cutting gap. The range of the focus diameters that can be meaningfully used for high-power lasers when laser cutting extends from 100 μm to 2000 μm, e.g., at least 150 μm, or at least 200 μm.

It is also of advantage for the stability and efficiency of the laser cutting process if the focus of the laser beam is arranged at the height of the workpiece surface or on the workpiece surface and (in particular in the case of fusion cutting) the cutting gap width corresponds to the focus diameter over the entire thickness of the sheet. The progression in the diameter of the focused beam (beam caustic) should therefore vary as little as possible over the entire thickness of the workpiece. The beam parameter product and the focus diameter of the focused laser beam should therefore be adapted to the workpiece thickness such that the resultant Rayleigh length corresponds to 0.5 times to 1.0 times the workpiece thickness. The resultant cutting gap width then corresponds to 1.0 times to 1.4 times the value of the chosen focus diameter.

The methods according to embodiments of the invention can in principle be implemented for all laser power outputs and proves to be especially successful for relatively great workpiece thicknesses, i.e., at laser power outputs of ≥3000 W. It has proven to be particularly advantageous for fusion cutting processes with nitrogen or nitrogen-oxygen mixtures (compressed air) as the cutting gas. Both a $CO_2$ laser and a solid-state or diode laser can be used as the laser source. The methods according to the invention can be advantageously used in particular with a diode laser as the beam source (as described, for example, in WO 2016/046954 A1), since due to the lower beam quality of the diode laser in comparison with a solid-state laser the cutting gap width increases, and therefore a great coverage of the cutting gap by the opening of the nozzle on the workpiece side has a particularly advantageous effect on the process.

In some implementations, a diode laser, which produces a multiple wavelength laser beam, is used particularly preferably as the laser beam source.

Further advantages and advantageous refinements of the subject matter of the invention emerge from the description, the drawing and the claims. Similarly, the features mentioned above and features still to be set out can each be used on their own or together in any desired combinations. The embodiments shown and described should not be understood as an exhaustive list, but rather as being of an exemplary character for the description of the invention.

In the drawings:

DESCRIPTION OF DRAWINGS

FIG. 1 shows a longitudinal section through a cutting gas nozzle moved over a workpiece in sheet form during the laser cutting according to the invention.

FIGS. 2A and 2B show a view from below of the workpiece in sheet form and of the cutting gas nozzle from FIG. 1. The cutting gas nozzle shown in FIG. 2A has a round nozzle opening cross-section and the cutting gas nozzle shown in FIG. 2B has an oval nozzle opening cross-section.

DETAILED DESCRIPTION

Figure 3:
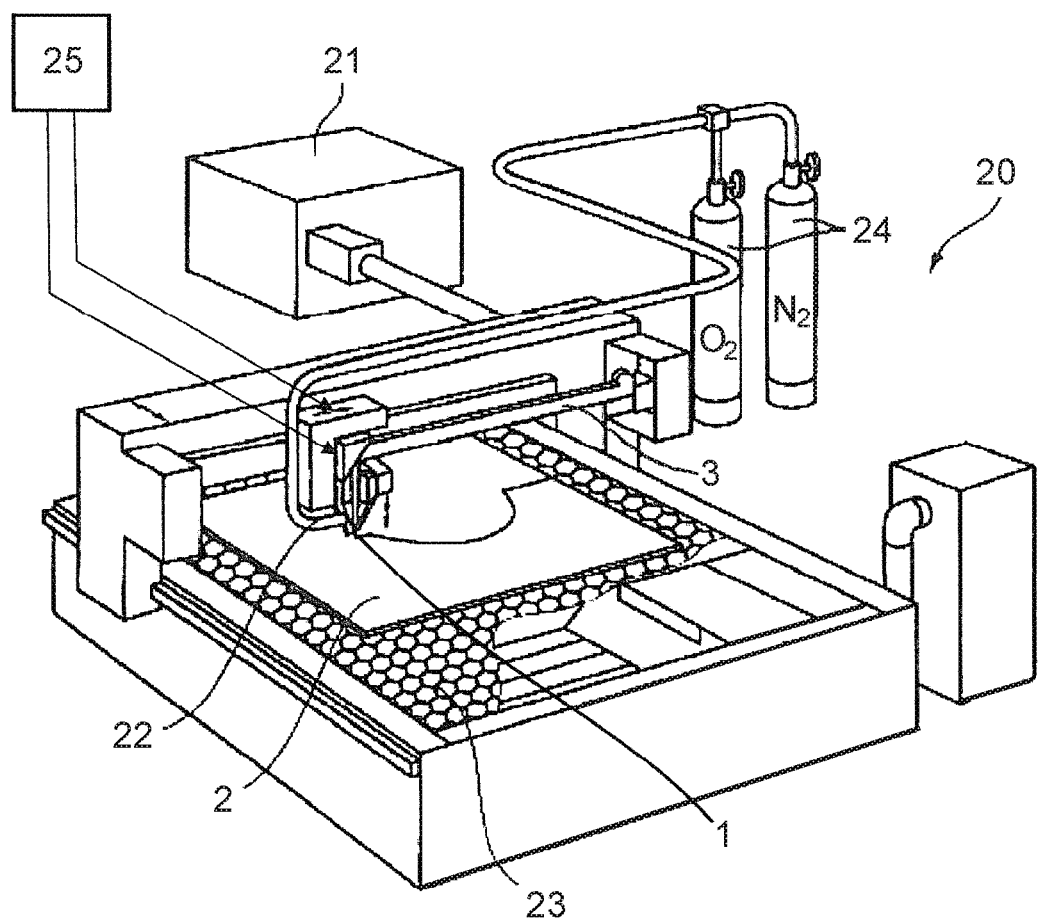
FIG. 3 shows a laser-cutting machine for carrying out the methods according to the certain embodiments of the invention for the laser cutting of workpieces in sheet form.

In the following description of the drawings, identical reference signs are used for components that are the same or functionally the same.

The cutting gas nozzle 1 shown in FIG. 1 is used for the laser cutting of metal workpieces 2 in sheet form with a thickness d of at least 2 mm via a laser beam 3 and a cutting gas 4 exiting concurrently through a nozzle opening 5 of the cutting gas nozzle 1. The laser cutting method may be a fusion cutting process in which nitrogen or a nitrogen-oxygen mixture, such as compressed air, is used as the cutting gas 4.

The cutting gas nozzle 1 is moved over the workpiece 2 in the cutting direction 6, to cut an opening 7 in the workpiece 2. A distance A (not shown to scale) between a nozzle end face 8 disposed on the workpiece side and the workpiece surface 9 can be between 0 mm and 0.5 mm, in certain embodiments. The cutting gas 4 exiting through the nozzle opening 5a has a cutting gas pressure p of at most 10 bar. The beam axis of the laser beam 3 is denoted by reference 10. The focus of the laser beam 3 is advantageously arranged at a height above the workpiece surface 9 or on the workpiece surface 9 and the focus diameter of the laser beam 3 is at least ⅕ of the workpiece thickness d, in particular embodiments. The beam parameter product and the focus diameter of the laser beam 3 are chosen such that the resultant Rayleigh length corresponds to 0.5 times to 1.0 times the workpiece thickness d, in some embodiments. The opening area of the nozzle opening 5 on the mouth side, the distance A of the nozzle end face 8 from the workpiece surface 9, and the cutting gas pressure p are chosen such that the maximum speed of the gas flow when it enters the cutting gap 7 does not exceed the speed of sound, in particular embodiments.

FIG. 2A shows the view from below of a cutting gas nozzle with a round opening cross-section, and FIG. 2B shows the view from below of a slot cutting gas nozzle with an oval opening cross-section. Alternatively, the opening cross-section of the slot cutting gas nozzle can also be rectangular. At the height A of the nozzle end face on the workpiece side, the beam axis 10 of the laser beam 3 is at a distance of at least 3 mm from the rear opening wall portion 11a, 11b of the nozzle opening 5a, 5b, respectively, in the cutting direction 6. Seen in the direction of the beam axis 10, the cutting gap 7 extending from the cutting front 12 is therefore covered or overlapped by the nozzle opening 5a, 5b of the cutting gas nozzle 1 over a length L of at least 3 mm. In the case of the round opening cross-section that is shown in FIG. 2A, the opening diameter of the nozzle opening 5a preferably corresponds to 10 times to 30 times the cutting gap width b and is at least 7 mm. In the case of the slot cutting gas nozzle 1 with an oval opening cross-section that is shown in FIG. 2B, the length a of the long axis of the nozzle opening 5b extending in the cutting direction 6 is preferably 10 times to 30 times the cutting gap width b, and is at least 7 mm.

A cutting gas pressure below 10 bar causes a small expansion of the cutting gas 4 exiting through the nozzle opening 5a. The resultant reduced speed of the flow has the effect of reducing the number and intensity of pressure impacts in the cutting gap 7. Due to the great coverage of the cutting gap 7 by the nozzle opening 5a, 5b, a breakaway of the cutting gas flow from the surface of the cutting front 12 occurs only—if at all—after a greatest possible extent of penetration into the cutting gap 7. These effects make a higher cutting speed possible with at the same time a high quality of the cut edges or corners and also an increase in the maximum workpiece thickness d that can be cut. The great coverage of the cutting gap 7 by the nozzle opening 5a, 5b has the effect of reducing the formation of burrs and oxidations when there are abrupt changes of direction. The "soft" large-area gas flow from the large opening diameter of the cutting gas nozzle 1 makes it possible still to reliably expel even melt that is produced further behind in the cutting gap 7 downwards out of the cutting gap 7, and thereby avoid the formation of burrs when moving around curves with a lower rate of advancement.

FIG. 3 shows a laser cutting machine 20 suitable for carrying out the laser cutting method described.

The laser cutting machine 20 has, for example, a $CO_2$ laser or solid-state laser and includes a diode laser as the laser beam generator 21, in certain embodiments. The laser cutting machine 20 includes a movable laser cutting head 22 and a workpiece support 23, on which the workpiece 2 is arranged. The laser beam 3 is generated in the laser beam generator 21 and is guided by means of a fiber-optic cable (not shown) or deflecting mirrors (not shown) from the laser beam generator 21 to the laser cutting head 22. The laser beam 3 is directed onto the workpiece 2 by means of a focusing optical system arranged in the laser cutting head 22. The laser-cutting machine 1 is additionally supplied with cutting gases 24, for example oxygen and nitrogen. The cutting gas 24 is fed to the cutting gas nozzle 1 of the laser cutting head 22, from which it leaves together with the laser beam 3. The laser-cutting machine 20 also comprises a machine controller 25, which is programmed to move the laser cutting head 22 together with its cutting gas nozzle 1 in relation to the workpiece 2 in a way corresponding to a cutting contour.

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:

1. A method of cutting a sheet metal workpiece having a thickness (d) of at least 2 mm, the method comprising
    positioning a laser beam in a nozzle opening of a cutting gas nozzle configured to cut via the laser beam and a cutting gas so that, at the nozzle end face, a beam axis of the laser beam along a direction of propagation of the laser beam is at least a distance of 3 mm from a rear opening wall portion of the nozzle opening;
    wherein the method comprises a fusion cutting process causing at least one of nitrogen and a nitrogen-oxygen mixture to be emitted as the cutting gas, and
    wherein an opening diameter on the workpiece side or a length (a) of a long axis of the nozzle opening is at least 7 mm;
    causing the cutting gas configured to concurrently exit the nozzle opening with the laser beam to be emitted through the nozzle opening at a cutting gas pressure (p) between 1 bar and 6 bar; and
    during the fusion cutting, a distance (A) from an upper surface of the workpiece to a nozzle end face is greater than 0 mm and lower than 0.5 mm.

2. The method according to claim 1, wherein positioning the laser beam in the nozzle opening for workpieces with the thickness (d) greater than 10 mm comprises positioning the beam axis of the laser beam at a distance of at least 4 mm from the rear opening wall portion of the nozzle opening.

3. The method according to claim 1, further comprising selecting an opening area of the nozzle opening on the workpiece side, a distance (A) of the nozzle end face from the upper surface of the workpiece surface, and the cutting gas pressure (p) such that the maximum speed of the gas flow when it enters the cutting gap does not exceed the speed of sound.

4. The method according to claim 1, wherein an opening diameter on the workpiece side or a length (a) of a long axis of the nozzle opening corresponds to 10 times to 30 times a cutting gap width (b).

5. The method according to claim 1, wherein a focus diameter of the laser beam is at least $\frac{1}{30}$ of the workpiece thickness (d).

6. The method according to claim 1, wherein a focus diameter of the laser beam is at least 150 μm.

7. The method according to claim 1, wherein the laser beam is focused on the workpiece surface.

8. The method according to claim 1, further comprising selecting a beam parameter product and a focus diameter of the laser beam such that the resultant Rayleigh length corresponds to 0.5 times to 1.0 times the workpiece thickness (d).

9. The method according to claim 1, further comprising generating the laser beam via a diode laser that generates a multiple wavelength laser beam.

10. A method of cutting a sheet metal workpiece having a thickness (d) of at least 2 mm, the method comprising
    positioning a laser beam in a nozzle opening of a cutting gas nozzle configured to cut via the laser beam and a cutting gas so that, at the nozzle end face, a beam axis of the laser beam along a direction of propagation of the laser beam is at least a distance of 3 mm from a rear opening wall portion of the nozzle opening;
    wherein the method comprises a fusion cutting process causing at least one of nitrogen and a nitrogen-oxygen mixture to be emitted as the cutting gas, and
    wherein the minimum opening diameter of the nozzle opening is greater than 7 mm,
    causing the cutting gas configured to concurrently exit the nozzle opening with the laser beam to be emitted through the nozzle opening at a cutting gas pressure (p) between 1 bar and 6 bar during the fusion cutting, a distance (A) from an upper surface of the workpiece to a nozzle end face is greater than 0 mm and lower than 0.5 mm.

* * * * *